(12) United States Patent
Burns et al.

(10) Patent No.: US 8,999,417 B2
(45) Date of Patent: Apr. 7, 2015

(54) METHOD OF PREPARATION OF A COATED FOOD PRODUCT

(75) Inventors: Ian George Burns, West Lothian (GB); Nigel Gary Brunyee, Kirby Hill (GB)

(73) Assignee: John Bean Technologies AB, Helsingborg (SE)

( * ) Notice: Subject to any disclaimer, the term of this patent is extended or adjusted under 35 U.S.C. 154(b) by 75 days.

(21) Appl. No.: 13/877,143

(22) PCT Filed: Sep. 27, 2011

(86) PCT No.: PCT/EP2011/066726
§ 371 (c)(1),
(2), (4) Date: Jun. 17, 2013

(87) PCT Pub. No.: WO2012/041828
PCT Pub. Date: Apr. 5, 2012

(65) Prior Publication Data
US 2013/0259988 A1    Oct. 3, 2013

(30) Foreign Application Priority Data
Oct. 1, 2010   (SE) ...................................... 1051024

(51) Int. Cl.
| A23P 1/08 | (2006.01) |
| A23L 1/01 | (2006.01) |
| A23L 1/00 | (2006.01) |
| A23L 1/31 | (2006.01) |
| A23L 1/315 | (2006.01) |
| A23L 1/325 | (2006.01) |

(52) U.S. Cl.
CPC .............. *A23L 1/0114* (2013.01); *A23L 1/005* (2013.01); *A23L 1/0135* (2013.01); *A23L 1/3103* (2013.01); *A23L 1/3157* (2013.01); *A23L 1/3257* (2013.01)

(58) Field of Classification Search
None
See application file for complete search history.

(56) References Cited

U.S. PATENT DOCUMENTS

| 4,943,438 A | 7/1990 | Rosenthal |
| 5,266,339 A | 11/1993 | Samson |
| 5,770,252 A | 6/1998 | McEwen |
| 6,162,481 A * | 12/2000 | Bernacchi et al. ............ 426/549 |
| 7,424,848 B2 * | 9/2008 | Jones et al. ..................... 99/386 |
| 7,531,200 B2 | 5/2009 | Fiszman Dal Santo |
| 2004/0241289 A1 | 12/2004 | Dal Santo |
| 2005/0266127 A1 * | 12/2005 | Komai et al. .................. 426/302 |
| 2010/0310712 A1 * | 12/2010 | Ashourian et al. ................ 426/7 |

FOREIGN PATENT DOCUMENTS

| EP | 0 289 862 A2 | 11/1988 |
| EP | 0 612 480 A2 | 8/1994 |
| GB | 1508781 * | 4/1978 |
| GB | 2 029 687 A1 | 3/1980 |
| GB | 2 185 874 A | 8/1987 |
| JP | 2003-102402 A | 4/2003 |
| JP | 2009-509568 A | 3/2009 |
| WO | 98/53712 A1 | 12/1998 |
| WO | 2007-041682 A1 | 4/2007 |
| WO | 2007/041682 A1 | 4/2007 |

OTHER PUBLICATIONS

International Search Report mailed Oct. 28, 2011, issued in corresponding International Application No. PCT/EP2011/066726, filed Oct. 19, 2011, 3 pages.

Notice of Reasons for Rejection dated Oct. 7, 2014, issued in corresponding Application No. JP 2013-530695, filed Sep. 27, 2011, 5 pages.

* cited by examiner

*Primary Examiner* — Carolyn Paden
(74) *Attorney, Agent, or Firm* — Christensen O'Connor Johnson Kindness PLLC

(57) ABSTRACT

The disclosure relates to a method for preparation of a food product. The method comprises the following steps: applying on the food product a batter composition; applying on the food product a coating composition; applying oil on the food product, wherein said batter composition, said coating composition and said oil form a coating of the food product; subjecting the food product and the coating to a hot air cooking treatment in an impingement oven at such a temperature and for such a period of time that the coating is cooked while the food product remains substantially untreated by the hot air cooking treatment, wherein the temperature of the hot air cooking treatment is in the range of 230° C. to 290° C. and wherein the hot air in the hot air cooking treatment is applied on both the top and the bottom of the food product.

20 Claims, No Drawings

METHOD OF PREPARATION OF A COATED FOOD PRODUCT

FIELD OF INVENTION

The present invention relates to a method for preparation of a coated food product.

TECHNICAL BACKGROUND

Food coatings for meats, seafood, vegetables and the like have been used for many years. In home preparation, the food is typically first coated with a batter comprising essentially flour, milk, eggs and seasoning, and the resulting product is then typically coated with bread or cereal crumbs which have been either dried or toasted. The coated food is then cooked, usually fried, and served for consumption.

Consumers typically enjoy food with a fried-like taste and texture. However, consumers also typically prefer the ease and simplicity of conventional baking or microwave cooking as an alternative to frying. Consequently, the food industry has responded by developing different methods and compositions for providing products which, upon conventional oven reheating, result in food with a fried-like texture and flavour.

In the industry coated food products are traditionally pre-fried in oil for 30-60 seconds at 180-200° C. prior to cooking/chilling/freezing. The purpose of this is for example to set or fix the coating to the substrate; to reduce the surface microbial load of the product; to develop colour; to add oil to the coating for enabling the product to be reconstituted by the end user in an oven or under a grill without burning; and to improve the mouth feel and eating characteristics of the final product after reconstitution.

The pre-frying process carries a number of inherent dangers which require special safety systems or procedures. Moreover, the pre-frying process is generally regarded as "dirty" in that often a great deal of time is required to clean the equipment after use. Further, the pre-frying process introduces large costs into the process for equipment, oil, energy etc. Furthermore, strict quality control procedures are required in order to ensure that the final product is as of the quality required. The term "the first thing that the consumer tastes in a fried product is the oil" is a major part of ensuring that frying oil quality is maintained at a high level. Moreover, consumers typically view fried foods as less nutritionally desirable due to the high fat content than other kind of foods.

Consequently, many attempts have been made by food processors and ingredient companies alike to find a way of eliminating the need for the pre-frying part of the process.

U.S. Pat. No. 7,531,200 disclose a process for preparing a frozen battered food product. The process starts with the pre-dusting of the food product to be batter-coated, followed by the application to said dusted food of a prepared batter, the composition of which batter comprises a cellulose derivative that coagulates in a hot water bath or in the presence of water vapour. The process continues with the heating of the coagulated, batter-coated food using a traditional, microwave or infrared oven, so that the coagulated batter coating layer does not melt on cooling, and concludes with the cooling and freezing of the above product.

U.S. Pat. No. 5,770,252 disclose a breaded food product being made by applying breading on an uncooked core food, and a starch overcoat film on the breading.

U.S. Pat. No. 5,266,339 disclose a method for preparing a battered foodstuff, particularly, chicken, which has the taste, texture and appearance of a fried food, but which has not been fried. The batters of the present invention are applied after the chicken has been cooked and while the chicken is hot. The latent heat of the chicken causes the batter to fix on the chicken. In a preferred embodiment, the batter coated chicken is further coated with a bread crumb mixture before the batter is fixed. The bread crumb mixture may also include flavoured vegetable based oils derived from frying chicken for the purpose of imparting savoury and fried food flavour characteristics to the non-fried food.

U.S. Pat. No. 4,943,438 disclose a breading crumb mixture and process for coating food products. The crumb mixture and process impart a fried-like texture and flavour to the resultant food products. The breading crumb mixture comprises extruded flour dough crumbs, dielectrically baked crumbs and beaded shortening. The process of the invention includes the steps of coating a food product with a binding agent, breading the coated product with the breading crumb mixture, baking the breaded product in a humidified oven, applying edible oil in atomized form to the surface of the baked product, and exposing the baked product surface to high temperature heating for the purpose of browning and crisping.

SUMMARY OF THE INVENTION

An object of the present invention is to provide an alternative method for achieving fried-like flavour and texture for food products consistent with consumer demands but without the disadvantages of frying.

The above object is achieved by the method according to the independent claim. Further embodiments of the invention are disclosed in the dependent claims.

In particular, according to a first aspect of the present invention, a method for preparation of a food product is disclosed. The method comprises the steps: applying on the food product a batter composition; applying on the food product a coating composition; applying oil on the food product, wherein said batter composition, said coating composition and said oil form a coating of the food product; and subjecting the food product and the coating to a hot air cooking treatment in an impingement oven at such a temperature and for such a period of time that the coating is cooked while the food product remains substantially untreated by the hot air cooking treatment, wherein the temperature of the hot air cooking treatment is in the range of 230° C. to 290° C. and wherein the hot air in the hot air cooking treatment is applied on both the top and the bottom of the food product.

That the food product remains substantially untreated by the hot air cooking treatment shall be interpreted as that the food product remains in a substantially uncooked state. For example if the food product is a raw piece of meat, e.g. chicken meat, the meat is raw even after the hot air cooking treatment according to the inventive method.

With the inventive method for preparation of a food product it is possible to apply a coating onto a food product without the need of frying the food product. Thus, drawbacks, listed in the technical background, with frying a food product is avoided although the by consumers desired fried-like flavour and texture is still present. One of the advantages of this invention is that it allows producers to accurately predict the oil content of their products, whatever type of oil is used. It therefore opens up avenues to produce low fat or lower fat or fat controlled type products. Moreover, the risk of a product carrying tainted oil flavours will also be reduced using this invention, leaving the product with an overall fresher cleaner more natural taste as compared with a pre-fried product. According to the inventive method a pre-cooked coated food product is produced. Pre-cooked in the meaning of the coated food product is partially cooked, i.e. the coating is cooked while the food product remains substantially uncooked. The pre-cooked coated food product may be finally cooked in a household type oven. An advantage is that the consumer may cook the food product according to the consumers own requirements since the food product remains substantially uncooked during the pre-cooking stage of the present invention. By applying the hot air in the hot air cooking treatment on both the top and the bottom of the food product an even cooking of the coating is enabled. Further by applying the hot air in the hot air cooking treatment on both the top and the bottom of the food product an even heat treatment to the coating is ensured. This results in a consistent product in terms of taste texture colour and overall appearance.

Furthermore, the method may comprise the step of applying on the food product a pre-dusting composition, wherein the pre-dusting composition is a part of the coating of the food product.

Moreover, the method may comprise the step of cooling the coated food product subsequent to the step of subjecting the food product and the coating to the hot air cooking treatment. By cooling or even freezing the pre-cooked food product the shell life of the food product will increase. The cooled or frozen coated food product can be finally cooked in a household type oven to give a crisp coated food product.

Furthermore, the temperature of the hot air impingement cooking treatment may preferably be 270° C. to 290° C.

Moreover, the period of time for the hot air impingement cooking treatment may be in the range of 30 s to 240 s, preferably 30 s to 180 s and more preferably 50 s to 120 s. Thus, it is made possible to produce a large quantity of food products per time unit.

Further, the oil may be applied by spraying. For example, the oil may be applied by spraying oil on all the sides of the food product simultaneously. By applying the oil by spraying it is possible to accurately control the amount of oil applied and to ensure even coverage. By applying the oil to all sides simultaneously a uniform distribution of oil all around the product is achieved.

Moreover, the amount of oil applied on the food product may be in the range of 1-10% of the weight of the food product and the coating after the hot air cooking treatment, preferably 3-8% of the weight of the food product and the coating after the hot air cooking treatment and more preferably 3-6% of the weight of the food product and the coating after the hot air cooking treatment.

DETAILED DESCRIPTION OF PREFERRED EMBODIMENTS

The inventive method relates to a method for coating a food product with a coating without the need of frying the food product. The inventive method may be applied on various types of food products, i.e. chicken, fish, seafood, red meat, cheese or vegetables.

According to an embodiment of the present invention the method comprises the following subsequent steps: a) Applying on the food product a pre-dusting composition; b) Applying on the food product a batter composition; c) Applying on the food product a coating composition; d) Applying oil on the food product. The pre-dusting composition, the batter composition, the coating composition and the oil form a coating of the food product; and e) Subjecting the food product and the coating to a hot air cooking treatment at such a temperature and for such a period of time that the coating is cooked while the food product remains substantially uncooked.

The different compositions are applied to the food product by different applying units familiar to the person skilled in the art.

The pre-dusting composition comprises flour and/or starch and/or proteins. Typical types of flour used are wheat, maize or rice flour. Both native and modified starch from corn, wheat, rice, potato, tapioca and others is typically used. Proteins such as vegetable gums, wheat gluten, egg albumin, milk protein are typically used. The pre-dusting composition may also comprise spices, salt, sugar and other kinds of flavouring. The pre-dusting composition is mainly used in order to improve adhesion of later applied compositions, control pick up of later applied compositions, change texture of the end food product and add flavour to the end food product.

According to one embodiment of the present invention the application of the pre-dusting composition is optional.

The batter composition typically comprises any of the ingredients of the pre-dusting composition together with a liquid, i.e. water, milk, wine, beer or oil.

The coating composition typically comprises breading crumbs blended with other additional ingredients such as spices. The breading crumbs are typically made from flour, gluten, water, salt and spices. The flour may be a mixture of wheat, rice and corn flour. Also malted barley extract may be added to the breading crumb dough. Also other kind of starches for example from potato or vegetables (e.g. peas) may be added. Potato or vegetables starch may also replace the flour. The breading crumbs are typically produced by extruding the raw dough. However, as the skilled person is well aware of, other production methods are also widely used.

The oil is best applied using a spinning disc to atomize the liquid. The liquid is sprayed or dripped on to a spinning disc in a chamber above and beneath a product transportation belt. This produces a cloud of atomized liquid which then totally covers the product. This allows the oil to be applied on all sides simultaneously in order to control accurately the amount of oil applied and to ensure even coverage.

The quality of the oil is important as this will have a major impact on the flavour and colour of the product. This choice however is more related to the consumer's requirements. Typical oils used are sunflower oil or olive oil but also other kinds of oil may be used. The oil used should be fresh and clean.

The oil application is required in order to prevent the coating from becoming dry and burnt when subjecting the food product and the coating to a hot air impingement cooking treatment. Further, the oil aid mouth feel and flavour development.

One of the advantages of this invention is that it allows producers to accurately predict the oil content of their products, whatever type of oil is used. It therefore opens up avenues to produce low fat or lower fat or fat controlled type products. Typically the amount of oil applied on the food product is in the range of 1-10% of the weight of the food product and the coating after the hot air cooking treatment, preferably 3-8% of the weight of the food product and the coating after the hot air cooking treatment and more preferably 3-6% of the weight of the food product and the coating after the hot air cooking treatment.

Moreover, the risk of a product carrying tainted oil flavours will also be reduced using this invention, leaving the product with an overall fresher cleaner more natural taste as compared with a pre-fried product.

As mentioned above the optional pre-dusting composition, the batter composition, the coating composition and the oil form a coating of the food product. Typically the coating constitute 15-60% of the total weight of the end product (food product plus coating) before subjecting the food product and the coating to the hot air cooking treatment and 15-60% of the total weight of the end product after subjecting the food product and the coating to the hot air cooking treatment. Moreover, the pre-dusting composition constitute 0.5-15% of the total weight of the coating. The ratio between the batter composition and the coating composition is between 1 to 1 and 1 to 2. Thus, from equal amount of batter composition and coating composition up to twice as much are coating composition as are batter composition.

After application of all the ingredients of the coating, the food product is totally covered by the coating. Preferably the coating is having uniform thickness all over the food product.

After the food product has been coated with the coating the food product and the coating is subjected to a hot air cooking treatment at such a temperature and for such a period of time that the coating is cooked while the food product remains substantially untreated by the hot air cooking treatment. By doing so the process is simulating the process of pre-frying without the need to immerse the product in hot cooking oil. The hot air cooking treatment is typically performed in an impingement oven by injecting hot air through nozzles directed towards the product. The air speed out from the nozzles is preferably between 15 m/s and 33 m/s, more preferably between 27 m/s and 32 m/s. In the impingement oven gas burners are typically used for producing the hot air. The temperature of the hot air impingement cooking treatment is in the range of 190° C. to 300° C., preferably 230° C. to 290° C. and more preferably 270° C. to 290° C. The period of time for the hot air impingement cooking treatment is in the range of 30 s to 240 s, preferably 30 s to 180 s and more preferably 50 s to 120 s. By passing the coated food product through an impingement oven at high temperature, 190° C. to 300° C., preferably 230° C. to 290° C. and more preferably 270° C. to 290° C., for a period of time, 30 s to 240 s, preferably 30 s to 180 s and more preferably 50 s to 120 s, the coating is cooked but yet leaves the substrate in a raw uncooked condition, i.e. this is a pre-cooking stage. According to one embodiment of the present invention, the hot air in the hot air cooking treatment is applied on both the top and the bottom of the food product. Accordingly, the impingement oven is equipped with first type of nozzles being arranged to direct hot air towards the top of the food product and a second type of nozzles being arranged to direct hot air towards the bottom of the food product. According to one embodiment of the present invention the air speed of the hot air applied to the top of the food product is different than the air speed of the hot air applied to the bottom of the food product. This may e.g. be achieved by use of independent fans controlling the top and bottom air flows. Alternatively, a Louver system may be used to control the amount of air passing over the top or the bottom of the product. By applying a higher air speed on the top of the food product than on the bottom of the food product an over pressure on the top of the food product may be achieved, this in order to prevent the food product moving around in the airstream. By applying a higher air speed on the bottom of the food product than on the top of the food product a drying effect on the bottom part of the food product may be achieved. Once the pre-cooking stage is finished the product can be chilled or frozen and the cooking process can be finalized in a household type oven to give a crisp coated food product. Thus, subsequent to the step of subjecting the food product and the coating to the hot air impingement cooking treatment the coated food product can be cooled.

According to an embodiment of the invention the method further comprises application of a colouring agent or a colour accelerant on the food product. The colour application is optional as it adds nothing to the textural and flavour characteristics of the product; however, it does make the product look more appealing. For example, the colour application may be used for applying grill stripes to the coating or for applying a heterogenic surface browning to the coating.

According to an embodiment of the invention the method further comprises spraying a water mist on the food product prior to subjecting the food product and the coating to a hot air impingement cooking treatment at such a temperature. The spraying of the water mist is normally performed directly before or directly after the application of the oil. The water is best applied using a spinning disc to atomise the liquid. The water is sprayed or dripped on to a spinning disc in a chamber above and beneath the product transportation belt. This produces a cloud of atomized water which then totally covers the product. This allows the water to be applied on all sides simultaneously in order to control accurately the amount of water applied and to ensure even coverage. By spraying a water mist on the food product the juiciness of the coating can be controlled. Moreover, by spraying a water mist on the food product weight loss of the food product may be limited.

It will be appreciated that the present invention is not limited to the embodiments shown. Several modifications and variations are thus conceivable within the scope of the invention.

The invention claimed is:

1. Method for preparation of a food product, comprising the steps
    applying on the food product a batter composition,
    applying on the food product a coating composition,
    applying oil on the food product, wherein the batter composition, the coating composition and the oil form a coating on the food product, wherein the food product and the coating define an end product,
    subjecting the food product and the coating to a hot air cooking treatment in an impingement oven at such a temperature and for such a period of time that the coating is cooked while the food product remains substantially untreated by the hot air cooking treatment, wherein the temperature of the hot air cooking treatment is in the range of 230° C. to 290° C. and wherein the hot air in the hot air cooking treatment is applied on both the top and the bottom of the food product.

2. Method according to claim 1, further comprising the step of applying on the food product a pre-dusting composition, wherein the pre-dusting composition is a part of the coating of the food product.

3. Method according to claim 2, wherein the pre-dusting is 0.5-15% of the total weight of the end product.

4. Method according to claim 1, further comprising the step of cooling the coated food product subsequent to the step of subjecting the food product and the coating to the hot air cooking treatment.

5. Method according to claim 1, wherein the temperature of the hot air cooking treatment is preferably in the range of 270° C. to 290° C.

6. Method according to claim 1, wherein the period of time for the hot air cooking treatment is in the range of 30 s to 240 s.

7. Method according to claim 1, wherein the oil is applied by spraying.

8. Method according to claim 7, wherein the oil is applied with a spinning disc to atomize the oil.

9. Method according to claim 1, wherein the oil is applied by spraying the oil on all the sides of the food product simultaneously.

10. Method according to claim 1, wherein the amount of the oil applied on the food product is in the range of 1-10% of the weight of the food product and the coating after the hot air cooking treatment.

11. Method according to claim 1, wherein the step of applying the oil on the food product is performed after the step of applying on the food product the coating composition.

12. Method according to claim 1, wherein the period of time for the hot air cooking treatment is in the range of 30 s to 180 s.

13. Method according to claim 1, wherein the period of time for the hot air cooking treatment is in the range of 50 s to 120 s.

14. Method according to claim 1, wherein the amount of the oil applied on the food product is in the range of 3-8% of the weight of the food product and the coating after the hot air cooking treatment.

15. Method according to claim 1, wherein the amount of the oil applied on the food product is in the range of 3-6% of the weight of the food product and the coating after the hot air cooking treatment.

16. Method according to claim 1, wherein the coating is in the range of 15-60% of the total weight of the end product before the step of subjecting the food product and the coating to the hot air cooking treatment.

17. Method according to claim 1, wherein the coating is in the range of 15-60% of the total weight of the end product before the step of subjecting the food product and the coating to the hot air cooking treatment.

18. Method according to claim 1, wherein the air speed of the hot air applied to the top of the food product is different than the air speed of the hot air applied to the bottom of the food product.

19. Method according to claim 1, further comprising the step of spraying a water mist on the food product before the step of applying oil on the food product and before the step of subjecting the food product and the coating to the hot air cooking treatment.

20. Method according to claim 1, further comprising the step of spraying a water mist on the food product after the step of applying oil on the food product and before the step of subjecting the food product and the coating to the hot air cooking treatment.

* * * * *